(12) United States Patent
Shen et al.

(10) Patent No.: US 7,529,050 B2
(45) Date of Patent: May 5, 2009

(54) TRACK WIDTH MEASUREMENT FOR MAGNETIC RECORDING HEADS

(75) Inventors: Yong Shen, Saratoga, CA (US); Mike X. Wang, San Jose, CA (US); Jing Zhang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 115 days.

(21) Appl. No.: 11/708,941

(22) Filed: Feb. 20, 2007

(65) Prior Publication Data

US 2008/0094743 A1  Apr. 24, 2008

Related U.S. Application Data

(60) Provisional application No. 60/852,793, filed on Oct. 18, 2006.

(51) Int. Cl.
 G11B 5/455 (2006.01)
 G11B 27/36 (2006.01)
(52) U.S. Cl. .......................................... 360/31; 360/75
(58) Field of Classification Search ....................... None
 See application file for complete search history.

(56) References Cited

U.S. PATENT DOCUMENTS

| | | | |
|---|---|---|---|
| 4,513,333 A * | 4/1985 | Young et al. | ........... 360/31 |
| 5,691,857 A * | 11/1997 | Fitzpatrick et al. | ........... 360/53 |
| 6,081,394 A | 6/2000 | Tsuboi | |
| 6,166,536 A | 12/2000 | Chen et al. | |
| 6,265,868 B1 | 7/2001 | Richter | |
| 6,680,609 B1 | 1/2004 | Fang et al. | |
| 6,696,831 B2 | 2/2004 | Nozu et al. | |
| 6,909,566 B1 * | 6/2005 | Zaitsu et al. | ........... 360/31 |
| 7,170,700 B1 * | 1/2007 | Lin et al. | ........... 360/31 |
| 7,203,023 B2 * | 4/2007 | Kuroda et al. | ........... 360/75 |
| 7,227,708 B2 * | 6/2007 | Feng | ........... 360/31 |
| 2003/0081338 A1 * | 5/2003 | Wang et al. | ........... 360/66 |
| 2004/0080845 A1 | 4/2004 | Yeo et al. | |

FOREIGN PATENT DOCUMENTS

| | | |
|---|---|---|
| JP | 59113572 | 6/1984 |
| JP | 684149 | 3/1994 |

OTHER PUBLICATIONS

Edelman, Harry, et al., "Design of Magnetic Recording Heads for High Track Densities", *IEEE Transactions on Magnetics*, vol. Mag-21, No. 6, (Nov. 1985),2583-2587.

Herk, A., et al., "Measurement of Side-Write, -Erase, and -Read Behavior of Conventional Narrow Track Disk Heads", *IEEE Transactions on Magnetics*, vol. Mag-16, No. 1, (Jan. 1980),114-119.

(Continued)

*Primary Examiner*—Hoa T Nguyen
*Assistant Examiner*—James L Habermehl

(57) ABSTRACT

One embodiment in accordance with the invention is a method for measuring a track width for a magnetic recording head comprising writing a first track and a second track on a disk at two different positions. Note that the first track is written at a frequency plus a frequency shift value while the second track is written at the frequency minus the frequency shift value.

15 Claims, 10 Drawing Sheets

OTHER PUBLICATIONS

Hoyt, R. F., et al., "Precise Side Writing Measurements Using A Single Recording Head", *IEEE Transactions on Magnetics*, vol. Mag-20, No. 5, (Sep. 1984),909-911.

Huang, Mingiyue, et al., "Effects of the Increase of Side Erase Band Width on Off-Track Capability of High Frequency Magnetic Recording", *IEEE Transactions on Magnetics*, vol. 32, No. 5, (Sep. 1996),3494-3496.

Lin, K. C., "Effect of Media Properties on Side Erase Bands", *IEEE Transactions on Magnetics*, vol. 26, No. 1, (Jan. 1990),132-134.

Lin, Tsann, et al., "Effects of Current and Frequency on Write, Read, and Erase Widths for Thin-Film Inductive and Magnetoresistive Heads", *IEEE Transactions on Magnetics*, vol. 25, No. 1, (Jan. 1989),710-715.

Mei, L., et al., "Coercivity and Frequency Dependence of Track Widths and Erase Bands in Thin Film Media", *IEEE Transactions on Magnetics*, vol. 34, No. 4, (Jul. 1998),1546-1548.

\* cited by examiner

TRACK WIDTH MEASUREMENT FOR MAGNETIC RECORDING HEADS

CROSS REFERENCE TO RELATED APPLICATIONS

This patent application claims the priority and benefit of the U.S. Provisional Patent Application No. 60/852,793 entitled "Method To Improve Gauge Capability of Track Width Measurement For Magnetic Recording Heads", by Jing Zhang et al., filed Oct. 18, 2006; which is assigned to the assignee of the present invention, the disclosure of which is hereby incorporated by reference.

BACKGROUND

Hard disk drives are used in almost all computer system operations. In fact, most computing systems are not operational without some type of hard disk drive (HDD) to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

This continual reduction in size has placed steadily increasing demands on the technology used in the HGA, particularly in terms of power consumption, shock performance, and disk real estate utilization. One recent advance in technology has been the development of the Femto slider, which is roughly one-third of the size and mass of the older Pico slider, which it replaces; over the past 23 years, slider size has been reduced by a factor of five, and mass by a factor of nearly 100.

As part of manufacturing hard disk drive, it is noted that track width measurement can be important in order to protect HGA off-track performance within a HDD. Dynamic electrical testing (DET) can be utilized as part of measuring track width before HDDs are produced. On the DET level, there are three important track width parameters, the MCW (magnetic core width), the MWW (magnetic write width), and the MRW (magnetic read width). On the HDD level, the MCW is one of the most important parameters to determine HDD format (in the case of adaptive format) and squeeze margin.

Based on HDD/DET correlation analysis, DET MCW is conventionally a preferred metric due to its better correlation with HDD MCW. However, its repeatability is not as good as MWW. This is a serious concern for HDD screening effectiveness, DET tester control, and DET/HDD yield management. MCW repeatability is compromised by track profile and subsequent linear fitting accuracy. To improve MCW repeatability, a linear fitting scheme has been improved by introducing adjustable threshold and best fit window. However, this addresses post-processing only and doesn't improve the original track profile repeatability.

SUMMARY

One embodiment in accordance with the invention is a method for measuring a track width for a magnetic recording head comprising writing a first track and a second track on a disk at two different positions. Note that the first track is written at a frequency plus a frequency shift value while the second track is written at the frequency minus the frequency shift value.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims.

Furthermore, in the following detailed description of various embodiments in accordance with the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Figure 1:
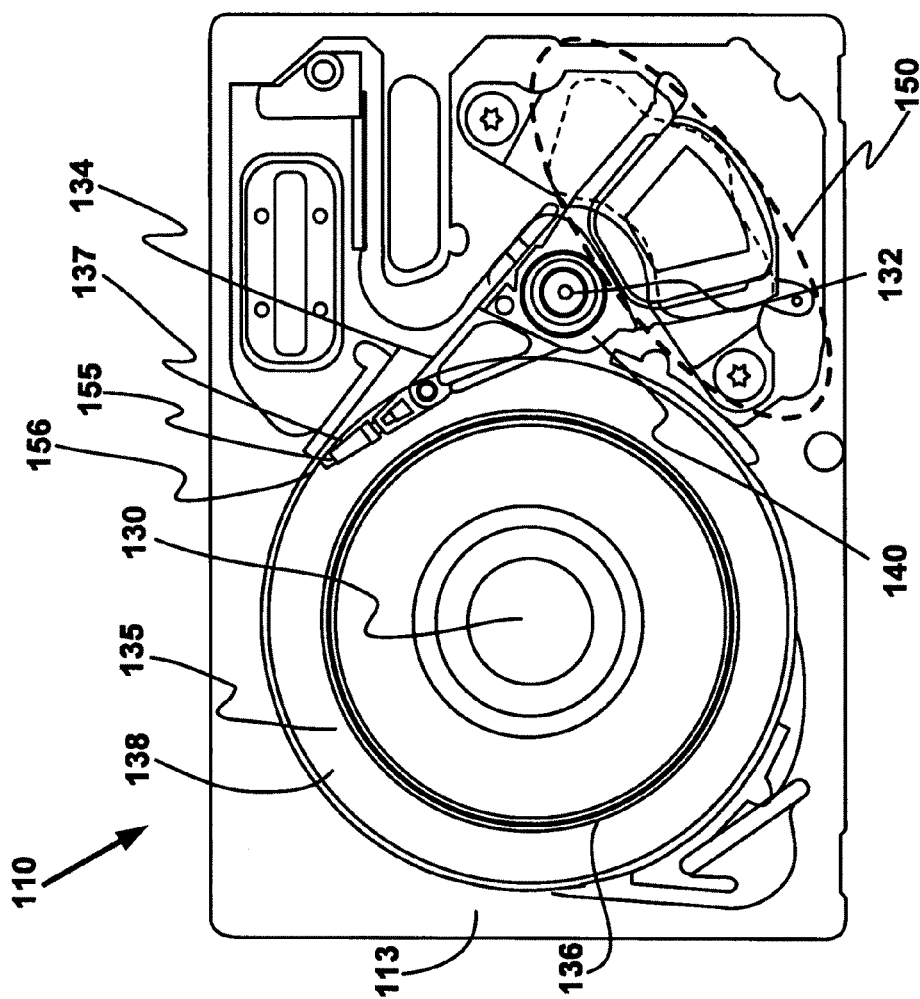
FIG. 1 is a plan view of an exemplary HDD with cover and top magnet removed in accordance with one embodiment of the present invention.

With reference now to FIG. 1, a plan view of an exemplary HDD with cover and top magnet removed is shown in accordance with one embodiment of the present invention. FIG. 1 illustrates the relationship of components and sub-assemblies of HDD 110 and a representation of data tracks 136 recorded on the disk surfaces 135 (one shown). The cover is removed and not shown so that the inside of HDD 110 is visible. The components are assembled into base casting 113, which provides attachment and registration points for components and sub-assemblies. The HDD 110 can be referred to as a data storage device.

A plurality of suspension assemblies 137 (one shown) are attached to the actuator arms 134 (one shown) in the form of a comb. A plurality of transducer heads or sliders 155 (one shown) are attached respectively to the suspension assemblies 137. Sliders 155 are located proximate to the disk surfaces 135 for reading and writing data with magnetic heads 156 (one shown). The rotary voice coil motor 150 rotates actuator arms 134 about the actuator shaft 132 in order to move the suspension assemblies 150 to the desired radial position on disks 112. The actuator shaft 132, hub 140, actuator arms 134, and voice coil motor 150 may be referred to collectively as a rotary actuator assembly.

Data is recorded onto disk surfaces 135 in a pattern of concentric rings known as data tracks 136. Disk surface 135 is spun at high speed by means of a motor-hub assembly 130. Data tracks 136 are recorded onto spinning disk surfaces 135 by means of magnetic heads 156, which typically reside at the end of sliders 155. FIG. 1 being a plan view shows only one head, slider, and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

Figure 2:
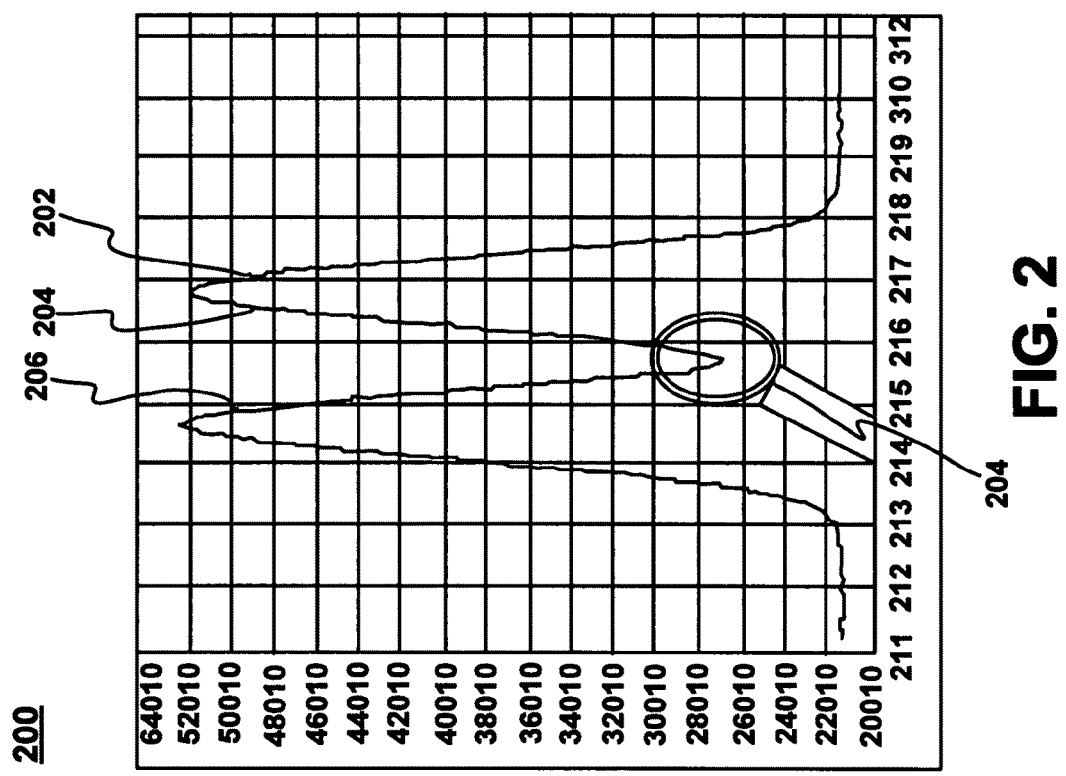
FIG. 2 is an exemplary graph in accordance with an embodiment of the invention.

In order to improve the repeatability for determining the magnetic core width (MCW) of a magnetic head (e.g., 156), one embodiment in accordance with the invention focuses on improving the repeatability of the minimal track average amplitude (TAA) in the center of the Off Track Read Capability (OTRC) profile. It is noted that the OTRC profile and its production are well known by those of ordinary skill in the art. FIG. 2 includes an exemplary graph 200 of a TAA-center (or a center minimal TAA) indicated by circle 204 from an OTRC profile 202 in accordance with an embodiment of the invention. The Y-axis of graph 200 represents microvolts while the X-axis represents the offset in micrometers. It is pointed out that the minimal TAA can be referred to as TAA-center (or SR_sum_SJ). For the OTRC calculation, line fitting is done on the two side slopes 204 and 206 of profile 202 and then there will be an intersection with zero noise flow. The width of the intersection is defined as the OTRC. In various embodiments in accordance with the invention, the test sequence can include magnetically writing two identical side tracks on a disk (e.g., 138) of the same frequency (f) at +x and −x positions, then erase from the center, and then measure the residual track profile. Moreover, a small frequency shift value (df or $\Delta f$) can be introduced when writing the two identical side tracks (f+df and f−df) or (f+$\Delta f$ and f−$\Delta f$). Specifically in one embodiment, a first track can be magnetically written on the disk at a first position at a frequency plus a frequency shift value (which can be expressed as: f+$\Delta f$) while a second track is magnetically written on the disk at a second position at the frequency minus the frequency shift value (which can be expressed as: f−$\Delta f$). In this manner, this artificially introduces modulation within the TAA-center signal within the same revolution.

Figure 3:
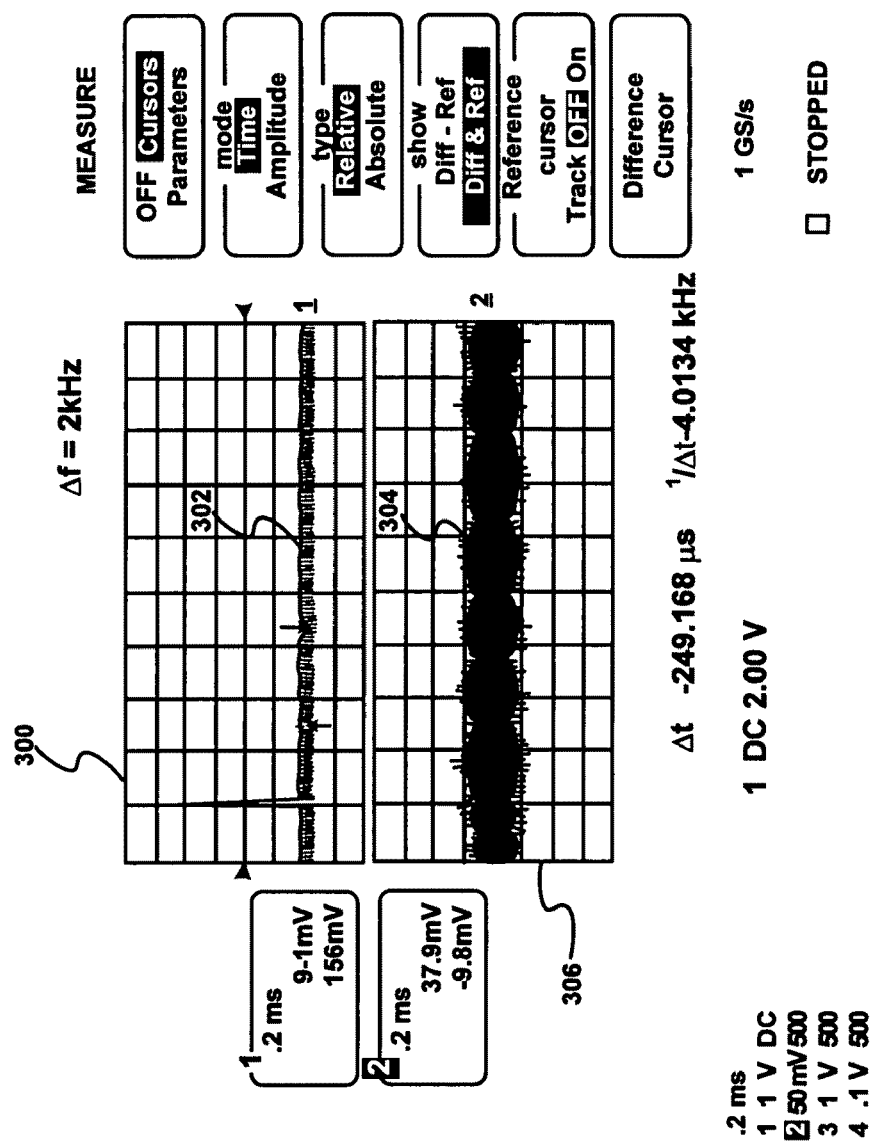
FIG. 3 includes two exemplary graphs in accordance with an embodiment of the invention.
Figure 4:
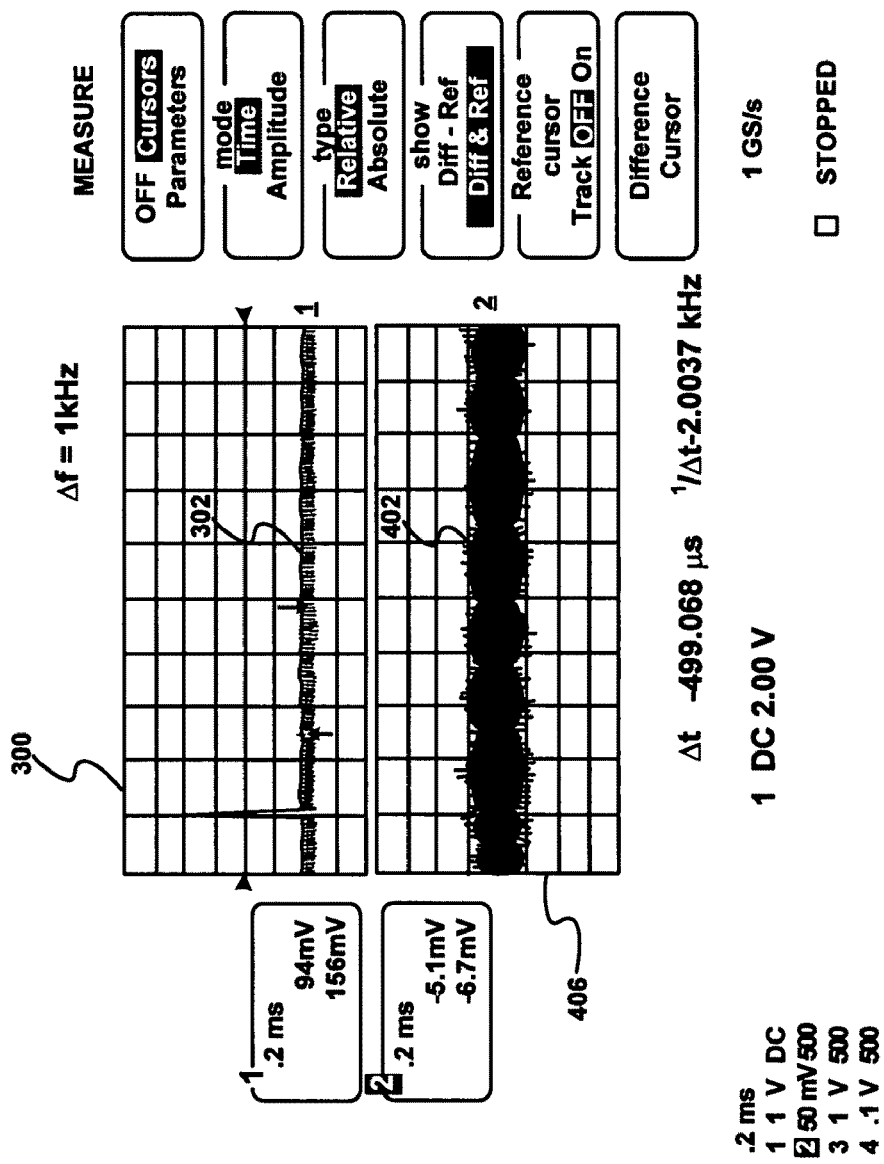
FIG. 4 includes another two exemplary graphs in accordance with an embodiment of the invention.

For example, FIG. 3 includes exemplary graphs 300 and 306 in accordance with an embodiment of the invention. Specifically, graph 300 includes a trace 302 showing the index where the written track begins, while graph 306 includes a trace 304 showing the read back signal for the TAA-center (or SR_sum_SJ) with a frequency shift ($\Delta f$) of 2 kilohertz (kHz), which corresponds to a "beating" period of approximately 250 microseconds. Additionally, FIG. 4 includes exemplary graphs 300 and 406 in accordance with an embodiment of the invention. Specifically, graph 300 includes the trace 302 showing the index where the written track begins, while graph 406 includes a trace 402 showing the read back signal for the TAA-center (or SR_sum_SJ) with a frequency shift ($\Delta f$) of 1 kHz, which corresponds to a "beating" period of approximately 500 microseconds.

In accordance with various embodiments of the invention, it is noted that the frequency shift (df or $\Delta f$) can be carefully chosen. For example in one embodiment, the frequency shift can be large enough so that there are multiple TAA cycles of modulation within one revolution of a HDD disk, yet small enough not to affect frequency domain measurement with limited resolution bandwidth (RBW) of a bandpass filter circuitry. For example in one embodiment, the frequency shift can be large enough so that each revolution can comprise 10-100 cycles of modulation, yet small enough not to affect frequency domain measurement with limited RBW on the order of 10-50 kHz. Since TAA can be defined and measured as the average amplitude within a track, the modulation can be averaged out, regardless of phase shift. In this manner, one embodiment in accordance to the invention includes a method to significantly improve the track profile (and therefore MCW) gauge capability.

The following example illustrates why conventional MCW techniques did not result in a repeatable MCW. For example, assuming two tracks have side amplitude of TAA1 and TAA2 when read at erase center. Ideally, two side tracks should have S/N transitions in synchronization with zero phase shift. In this case the read back signal for TAA-center (or SR_sum_SJ) should be TAA1+TAA2. However, it is noted that even the most advanced commercial dynamic electrical testing (DET) test systems cannot accurately maintain constant phase shift along the whole data track, which can comprises $10^6$ to $10^7$ transitions. As such, in the worse case, two tracks cancel out (or annihilate) each other with 180 degree phase shift and TAA-center=TAA1−TAA2. Therefore, TAA-center could vary randomly between TAA1+TAA2 and TAA1−TAA2. With non-repeatable track profile, error associated with subsequent linear fitting accumulates to MCW measurement error. Therefore, to improve MCW repeatability, various embodiments in accordance with the invention improve the repeatability of TAA-center.

Figure 5:
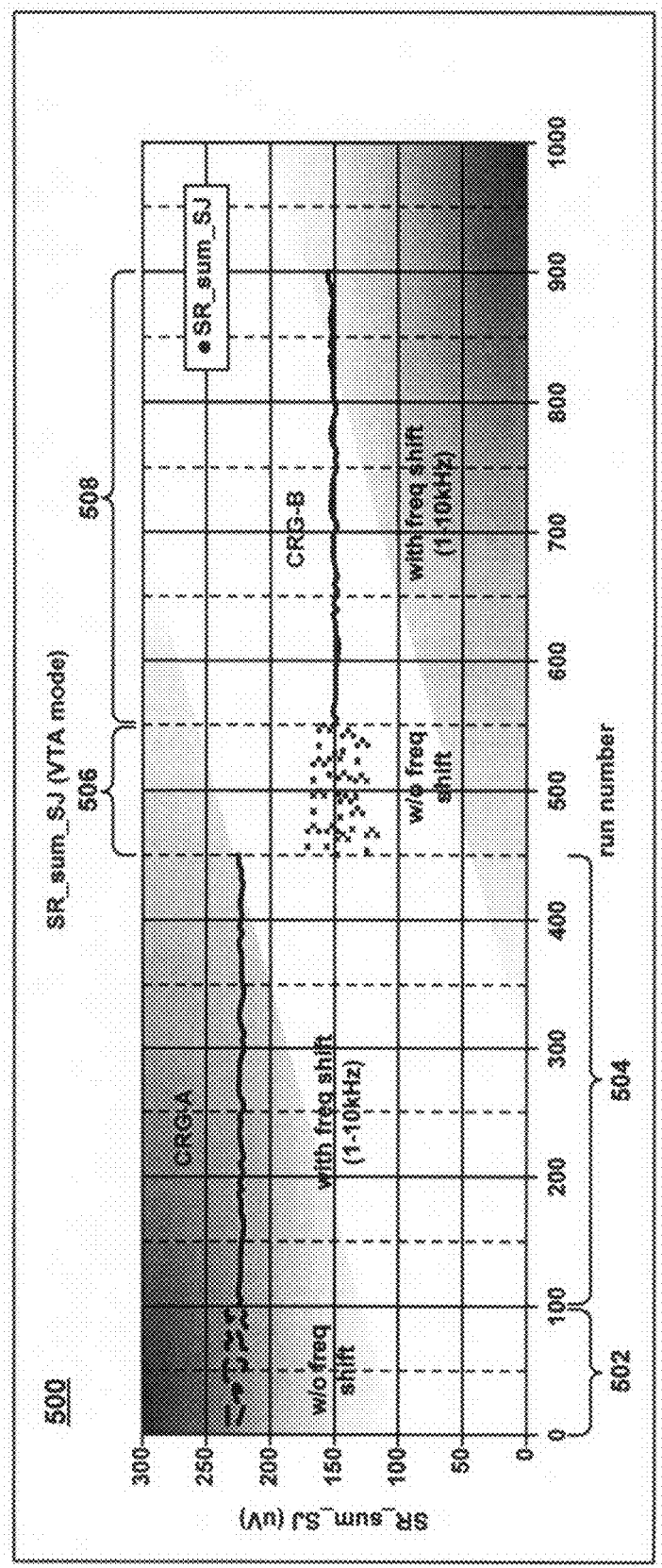
FIG. 5 is an exemplary graph in accordance with one embodiment of the invention.

FIG. 5 is an exemplary graph 500 in accordance with one embodiment of the invention. Specifically, the Y-axis of graph 500 represents the TAA-center (or SR_sum_SJ) in microvolts (uV) while the X-axis represents the run number. It is noted that the TAA-center data points of sets 502 and 504 are from a first magnetic read/write head (CRG-A) while the TAA-center data points of sets 506 and 508 are from a second magnetic read/write head (CRG-B). It can be seen by sets 502 and 506 that by not using a frequency shift (Δf) in accordance with the invention that the one hundred TAA-center data points of each set are shattered. However, it can be seen by sets 504 and 508 that by using a frequency shift (Δf) in accordance with an embodiment of the invention that the three hundred fifty TAA-center data points of each set are more repeatable, more consistent, and more aligned, which improves the repeatability of MCW.

Note that a method in accordance with the invention can be implemented as a software module when executed effects the method, as computing device readable code on a computing device usable medium where the code when executed effect the method, as application instructions on a computer-usable medium where the instructions when executed effect the method, and the like. It is pointed out that a software module in accordance with an embodiment of the invention can replace current software modules that are used to measure MCW, such as but not limited to, triple track module (also known as Squash/OTRC). Furthermore, a software module in accordance with an embodiment of the invention can also be used to measure SR (Side Read) and CT (CrossTalk) with substantially no test time penalty. It is pointed out that Side Read and Crosstalk can be abbreviated as "SR/CT".

Note that a software module in accordance with an embodiment of the invention not only significantly improves gauge capability, it can also seamlessly be integrated with SR/CT (legacy Odawara) test with significant DET throughput improvement. With this approach, the SR/CT can be measured in both time domain (VTA) and frequency domain (FTA). Since legacy SR/CT was measured in frequency domain, this can provide a clear transition path to perpendicular magnetic recording (PMR) when alternating current (AC) erase and frequency domain TAA measurement are involved.

Figure 6:
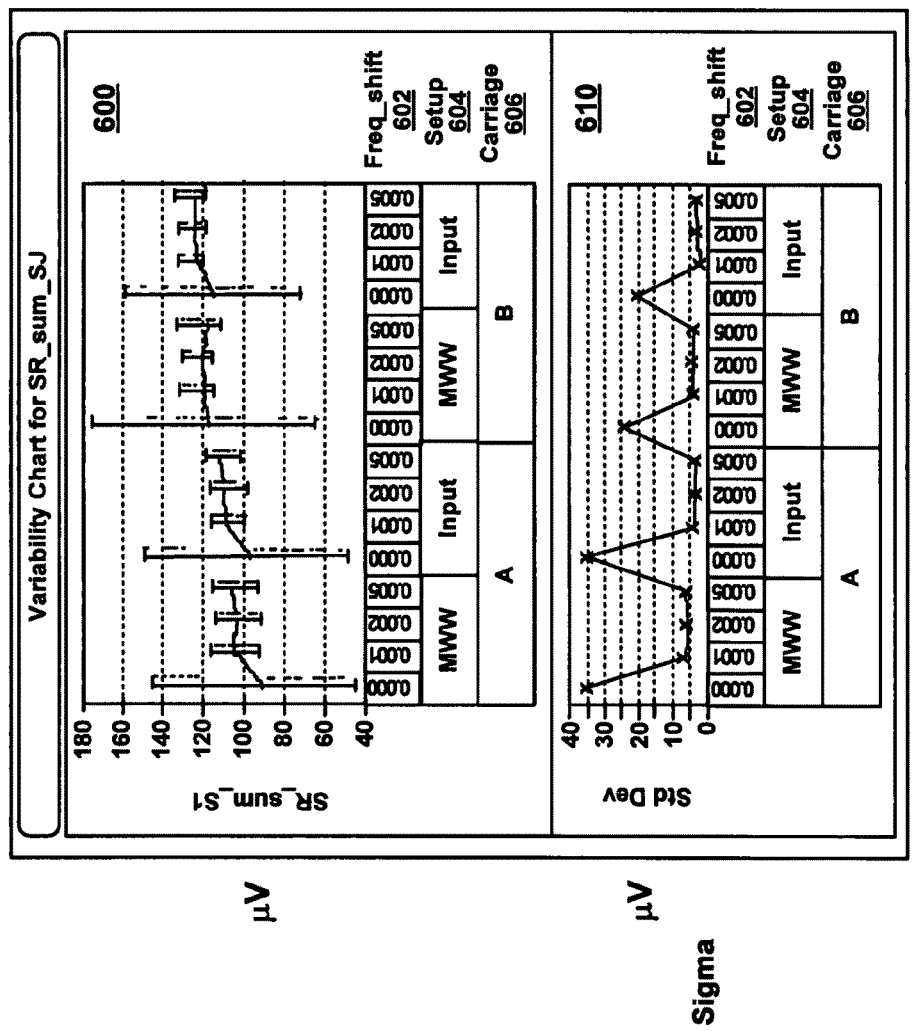
FIG. 6 include two graphs in accordance with an embodiment of the invention.

FIG. 6 includes exemplary graphs 600 and 610 in accordance with an embodiment of the invention. Specifically, the Y-axis of both graphs 600 and 610 represents microvolts (μV) while the X-axis includes different frequency shift values 602, setups 604, and carriages 606. Note that in graph 600 each of the 0.000 frequency shifts 602 represents measurements of the TAA-center (or SR_sum_SJ) using Squash/OTRC and do not include any embodiments of the invention. As such, it results in several wide vertical spreads of TAA-center values, thereby illustrating non-repeatability of the measured TAA-center values. Conversely, all of the other non-zero values of frequency shifts 602 represent measurements of the TAA-center using various embodiments in accordance with the invention together with triple track module and SR/CT. As such, it results in several tight or close vertical spreads of TAA-center values, thereby illustrating significant repeatability (or consistency) of the measured TAA-center values. The TAA-center can be defined as the center minimal TAA in an OTRC profile.

It is pointed out that graph 610 of FIG. 6 is the sigma that corresponds to graph 600. Note that the conventional technique can result in the sigma as high as 35 microvolts. However, in accordance with various embodiments of the invention, the sigma corresponding to the TAA-center values measure with a non-zero frequency shift 602 are significantly reduced to approximately 5 microvolts. This is a large improvement.

Figure 7:
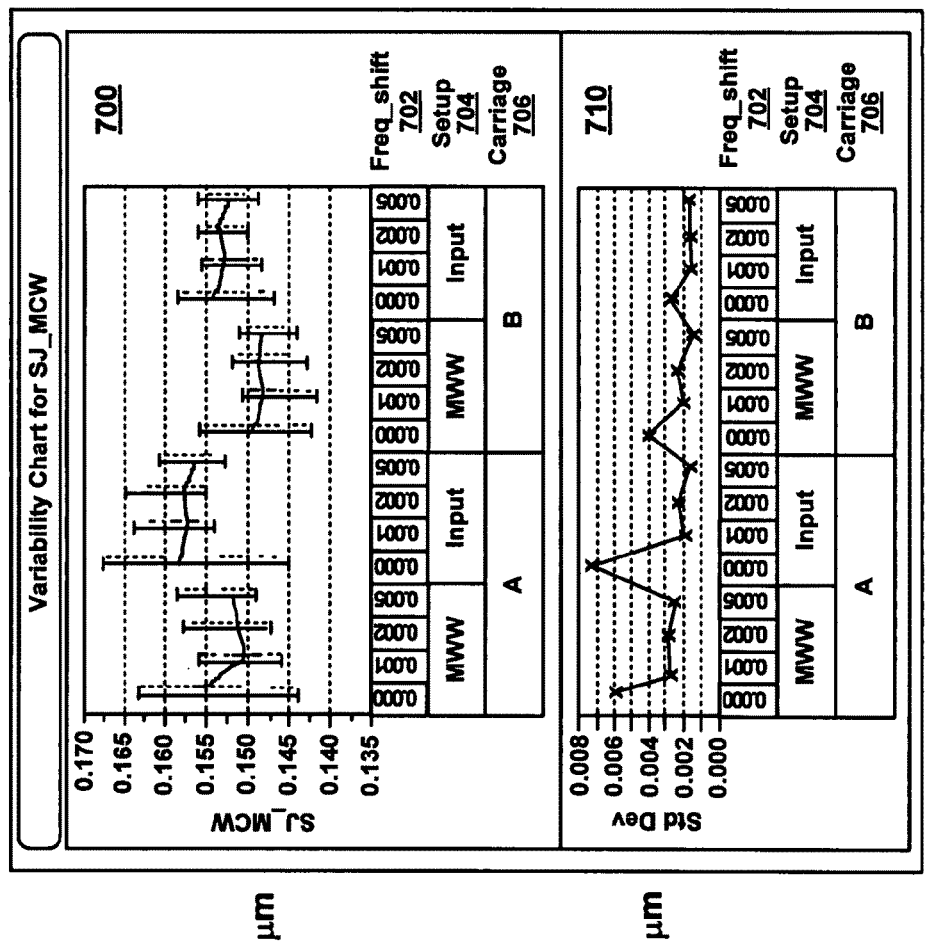
FIG. 7 include yet another two exemplary graphs in accordance with an embodiment of the invention.

FIG. 7 includes exemplary graphs 700 and 710 in accordance with an embodiment of the invention. Specifically, the Y-axis represents micrometers (or microns) in both graphs 700 and 710 while the X-axis includes different frequency shift values 702, setups 704, and carriages 706. Note that in graph 700 each of the no frequency shifts or 0.000 frequency shifts 702 (conventional technique) represents measurements of the MCW and do not include any embodiments of the invention. As such, it results in several wide vertical spreads of MCW values, thereby illustrating non-repeatability of the measured MCW values. Conversely, all of the other non-zero values of frequency shifts 702 represent measurements of the MCW using various embodiments in accordance with the invention. As such, it results in several tighter or closer vertical spreads of MCW values, thereby illustrating significant repeatability (or consistency) of the measured MCW values.

The graph 710 of FIG. 7 is the sigma that corresponds to graph 700. Note that the conventional technique can result in the sigma more than 0.007 micrometers. However, in accordance with various embodiments of the invention, the sigma corresponding to the MCW values measure with a non-zero frequency shift 702 are significantly reduced to approximately 0.003 micrometers and less. This is an improvement.

Figure 8:
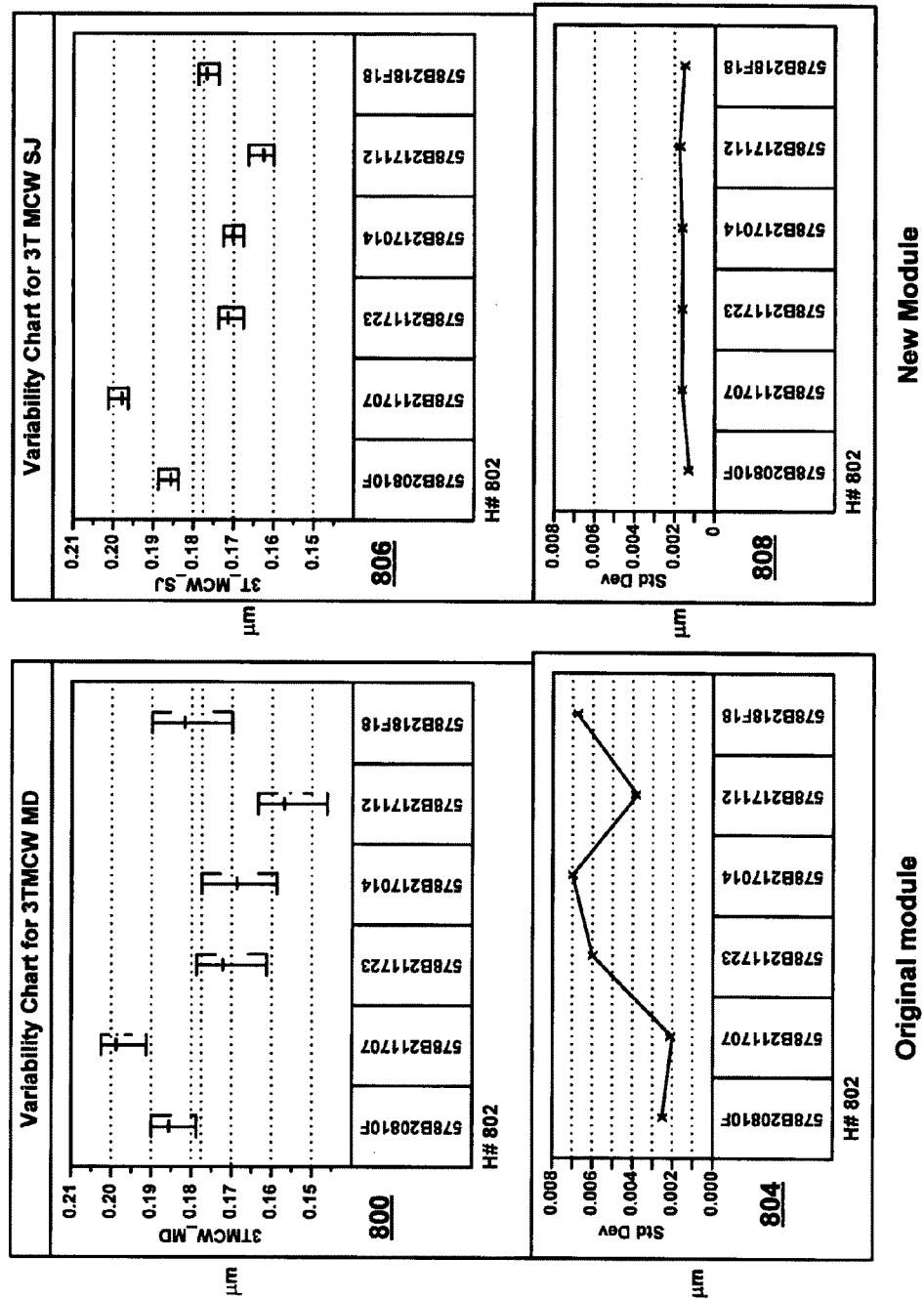
FIG. 8 includes four exemplary graphs in accordance with one embodiment of the invention.

FIG. 8 includes exemplary graphs 800, 804, 806 and 808 that illustrate a comparison of MCW repeatability in accordance with one embodiment of the invention. Note that the Y-axis represents micrometers (μm) or microns in graphs 800, 804, 806 and 808 while the X-axis includes head identifiers 802 for the same six magnetic read/write heads. The graph 800 represents thirty MCW measurements of each of the six magnetic heads using a conventional technique while graph 804 represents the corresponding sigma. Conversely, graph 806 represents thirty MCW measurements of each of the six magnetic heads utilizing a non-zero frequency shift value in accordance with an embodiment of the invention while graph 808 represents the corresponding sigma.

Specifically, graph 800 includes six wide vertical spreads of thirty conventionally measured MCW values that each correspond to the six magnetic read/write heads, thereby illustrating non-repeatability (or inconsistency) of the measured MCW values. Furthermore, the sigmas of graph 804 are inconsistent as they extend from 0.002 μm to over 0.007 μm for the six magnetic heads. Conversely, graph 806 includes six tight vertical groups of thirty measured MCW values in accordance with the invention that each correspond to the six magnetic read/write heads, thereby illustrating repeatability (or consistency) of the measured MCW values. Note that the corresponding sigmas of graph 808 are more consistent and just extend from about 0.0012 μm to about 0.0018 μm. With this side-by-side MCW comparison, it is noted that utilizing a frequency shift in accordance with an embodiment of the invention to measure the MCW provided a huge improvement over the conventional technique.

Figure 9:
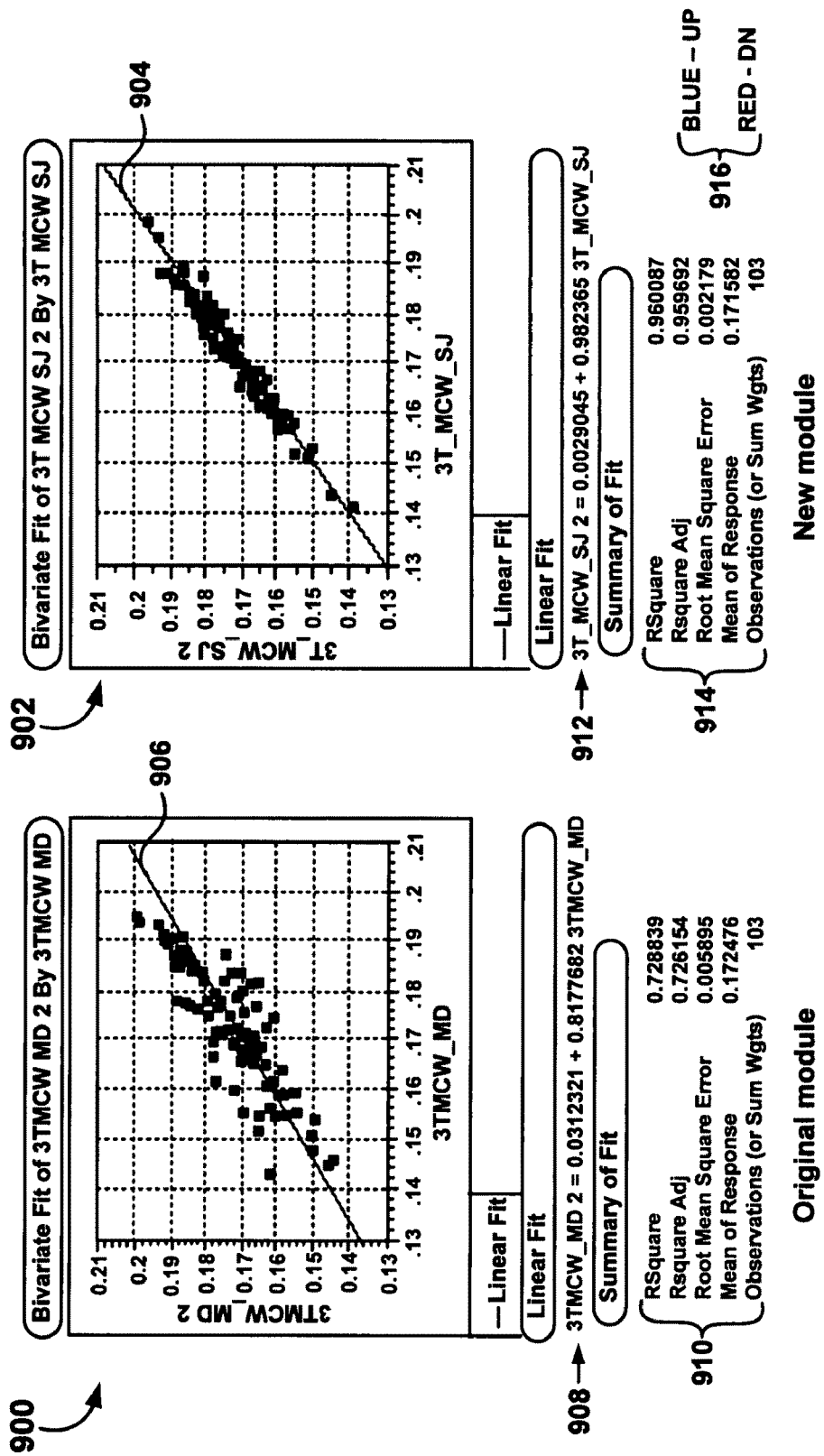
FIG. 9 includes two exemplary graphs in accordance with one embodiment of the invention.

FIG. 9 includes exemplary graphs 900 and 902 that illustrate a comparison of the self-correlation of MCW measurements in accordance with one embodiment of the invention. Specifically, a self-correlation means the same group of magnetic read/write heads were run twice and then the results were correlated by the first run to the second run. Graph 900 shows the self-correlation MCW measurements using a conventional technique (original module) while graph 902 shows that the self-correlation MCW measurements using an embodiment in accordance with the invention (new module).

Note that it is desirable to have the self-correlation MCW measurement values of graphs 900 and 902 tightly grouped along a 45 degree diagonal line that equally separates their X-axis and Y-axis. As such, it is clear that graph 902 in accordance with the invention is much more preferable since its self-correlation MCW measurement values are more tightly grouped than those of conventional graph 900. Note that a linear fit line 904 of the self-correlation MCW measurements of graph 902 represents approximately a 45 degree diagonal line that equally separates the X-axis and Y-axis of graph 902. Furthermore, the self-correlation MCW measurement values of graph 902 are tightly grouped along the linear fit line 904. By way of comparison, a linear fit 906 of conventional graph 900 does not equally separate the X-axis and Y-axis of graph 900 and the self-correlation MCW measurement values are scattered.

Within FIG. 9, a linear fit equation 908 of conventional graph 900 illustrates the relationship between the first conventional run (3TAACW_MD) of the magnetic read/write heads and the second conventional run (3TAACW_MD 2) of the magnetic read/write heads. Additionally, a summary of fit information 910 includes specific details associated with graph 900. Conversely, a linear fit equation 912 of graph 902 in accordance with the invention illustrates the relationship between the first run (3T_MCW_SJ) of the magnetic read/write heads in accordance with the invention and the second run (3T_MCW_SJ 2) of the magnetic read/write heads in accordance with the invention. Furthermore, a summary of fit information 914 includes specific details associated with graph 902. Note that the summaries of fit information 910 and 914 each include an RSquare ($R^2$) value that is a correlation factor and a statistics term. For an ideal correlation, $R^2=1$. Conversely, when there is no correlation, $R^2=0$. It is pointed out that the conventional $R^2$ of the summary of fit information 910 is equal to a value of 0.728839 while the $R^2$ in accordance with an embodiment of the invention of the summary fit information 914 is equal to a value of 0.960087. Therefore, the $R^2$ value in accordance with an embodiment of the invention is much closer to the ideal correlation of 1 than the conventional $R^2$ value.

It is noted that guide 916 includes information pertaining to both graphs 900 and 902. Specifically, the blue squares (shown now as black) represent the up run while the red squares (shown now as gray) represent the down run.

It is pointed out that 103 HGAs were run twice in order to produce each of graphs 900 and 902. The X-axis of graphs 900 and 902 represent first run of MCW measurement while the Y-axis represent second run of MCW measurement (from the same tester with the same parts and media). Note that if the self-correlation is not good, then it cannot be expected that there will be good HDD to DET correlation with that particular MCW measurement technique. As such, graph 902 illustrates that the MCW measurement in accordance with an embodiment of the invention it is much more predictable. As such, by using a method in accordance with the invention for measuring MCW, there is a significant impact to DET tester control and data integrity. Furthermore, it extends the life span of the tester without expensive hardware upgrade. Additionally, a software module in accordance with an embodiment of the invention can merge with SR/CT for worldwide mass production (WW MP) implementation.

One advantage of utilizing an embodiment in accordance with the invention is the improved HDD to DET correlation, and improved gauge capability of the DET measurement. But more importantly, it can extend the lifetime of the tester equipment. For example, if an inaccurate technique is used to measure MCW, then the inconsistent results can call into question the integrity of the tester equipment and whether it can position the magnetic head accurately enough, thereby resulting in the call to replace the tester equipment. However, by resolving the issue with a software method (for example) in accordance with one embodiment of the invention that is more consistent, it can at least extend the lifetime of the tester equipment by two generations, which is significant. As such, by using one or more embodiments in accordance with the invention, the MCW can be calculated more accurately and then the accuracy of the tester machinery or equipment is not called into question prematurely. It is pointed out that instead of operating costly hardware, embodiments in accordance with the invention can be implemented in software, but is not limited to such.

Figure 10:
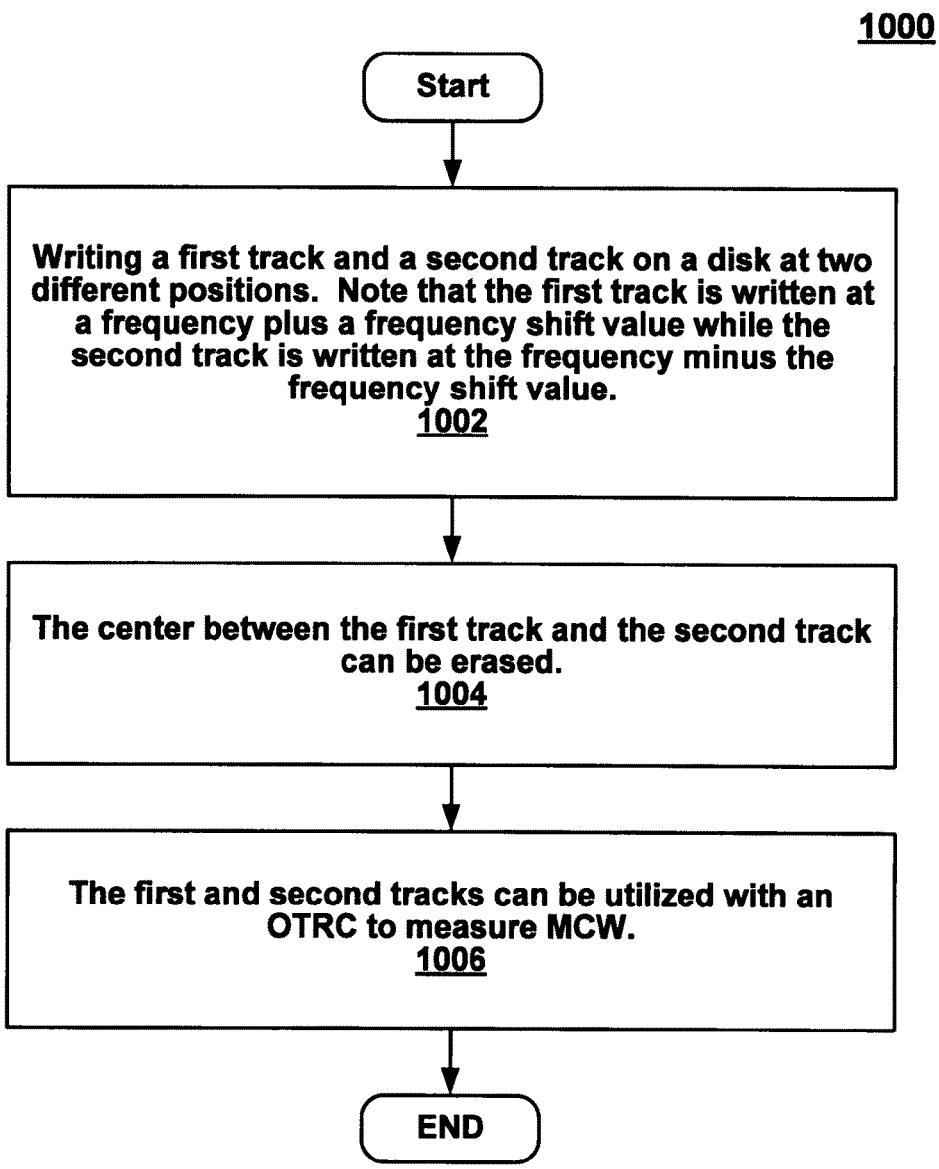
FIG. 10 is a flow diagram of an exemplary method in accordance with various embodiments of the invention.

FIG. 10 is a flow diagram of an exemplary method 1000 in accordance with various embodiments of the invention for measuring a track width for a magnetic recording head. Method 1000 includes exemplary processes of various embodiments of the invention that can be carried out by a processor(s) and electrical components under the control of computing device (or computing system) readable and executable instructions (or code), e.g., software. The computing device (or system) readable and executable instructions (or code) may reside, for example, in data storage features such as volatile memory, non-volatile memory, and/or mass data storage that can be usable by a computing device or system. Note that the computing device (or system) can include one or more processors that can be coupled to one or more data storage features that can store the computing device (or system) readable and executable instructions (or code). The computing device (or system) readable and executable instructions (or code) may reside in any type of computing device (or system) usable medium. Although specific operations are disclosed in method 1000, such operations are exemplary. Method 1000 may not include all of the operations illustrated by FIG. 10. Also, method 1000 may include various other operations and/or variations of the operations shown by FIG. 10. Likewise, the sequence of the operations of method 1000 can be modified. It is noted that the operations of method 1000 can be performed manually, by software, by firmware, by electronic hardware, or by any combination thereof.

At operation 1002, a first track and a second track are magnetically written on a disk at two different positions. Note that the first track can be written at a frequency plus a frequency shift value while the second track can be written at the same frequency minus the frequency shift value. It is appreciated that operation 1002 can be implemented in a wide variety of ways. For example, operation 1002 can be implemented in any manner similar to that described herein, but is not limited to such.

At operation 1004 of FIG. 10, a center area between the first track and the second track can be erased. Note that that operation 1004 can be implemented in a wide variety of ways. For example, operation 1004 can be implemented in any manner similar to that described herein, but is not limited to such.

At operation 1006, the first and second tracks can be utilized with an OTRC to measure the MCW. It is appreciated that operation 1006 can be implemented in a wide variety of ways. For example in an embodiment, at operation 1006 a measurement can be made of the residual track profile of the first track and the second track. Note that operation 1006 can be implemented in any manner similar to that described herein, but is not limited to such. At the completion of operation 1006, process 1000 can be exited.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method for measuring a track width for a magnetic recording head comprising:
   modulating a track average amplitude center signal by writing a first track and a second track on a disk at two different positions, wherein said first track is written at a frequency plus a frequency shift value while said second track is written at said frequency minus said frequency shift value;
   erasing between said first track and said second track; and
   measuring a residual track profile.

2. The method of claim 1, further comprising:
   utilizing said first track and said second track with an Off Track Read Capability profile.

3. The method of claim 2, wherein said Off Track Read Capability profile is utilized for measuring a magnetic core width.

4. The method of claim 1, further comprising:
   utilizing said first track and said second track to measure a magnetic core width.

5. The method of claim 1, wherein said writing said first track and said second track on said disk is performed by said magnetic recording head.

6. A computing system comprising:
   a memory for storing instructions of a method for measuring a track width for a magnetic recording head;
   a processor couple to said memory and for performing said method comprising:
   modulating a track average amplitude center signal by writing a first track and a second track on a disk at two different positions, wherein said first track is written at a frequency plus a frequency shift value while said second track is written at said frequency minus said frequency shift value;
   erasing a center area between said first track and said second track; and
   measuring a residual track profile.

7. The computing system of claim 6, said method further comprising:
   utilizing said first track and said second track with an Off Track Read Capability profile.

8. The computing system of claim 7, wherein said Off Track Read Capability profile is utilized for measuring a magnetic core width.

9. The computing system of claim 6, said method further comprising:
   utilizing said first track and said second track to measure a magnetic core width.

10. The computing system of claim 6, wherein said writing said first track and said second track on said disk is performed by said magnetic recording head.

11. Application instructions on a computer-usable medium where the instructions when executed effect a method comprising:
    modulating a track average amplitude center signal by writing a first track and a second track on a disk at two different positions for measuring a track width for a magnetic recording head, wherein said first track is written at a frequency plus a frequency shift value while said second track is written at said frequency minus said frequency shift value;
    erasing between said first track and said second track; and
    measuring a residual track profile.

12. The application instructions of claim 11, wherein said method further comprising:
    utilizing said first track and said second track with an Off Track Read Capability profile.

13. The application instructions of claim 12, wherein said Off Track Read Capability profile is utilized for measuring a magnetic core width.

14. The application instructions of claim 11, wherein said method further compnsing:
    utilizing said first track and said second track to measure a magnetic core width.

15. The application instructions of claim 11, wherein said writing said first track and said second track on said disk is performed by said magnetic recording head.

* * * * *